Figure 1:
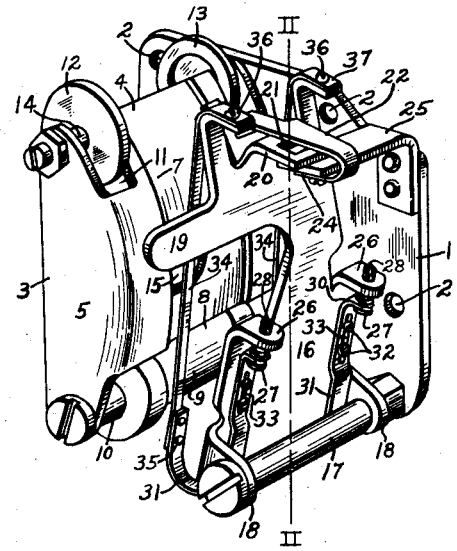

Aug. 16, 1932.  W. A. SCHULZ  1,872,353
FILM GATE
Filed Jan. 11, 1930  3 Sheets-Sheet 1

INVENTOR
Walter A. Schulz
BY
ATTORNEY

Aug. 16, 1932.  W. A. SCHULZ  1,872,353
FILM GATE
Filed Jan. 11, 1930   3 Sheets-Sheet 2
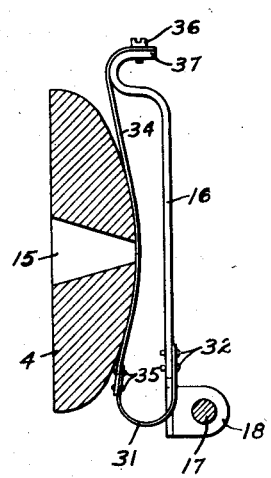
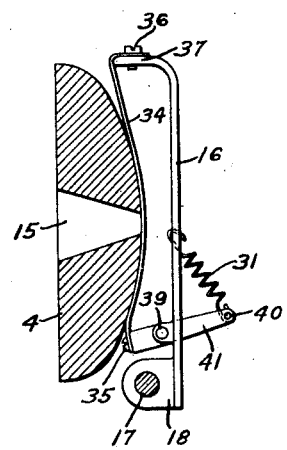
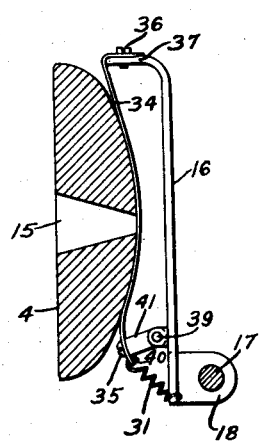
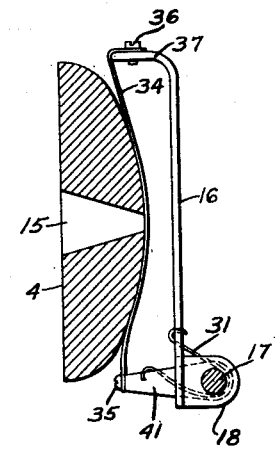
INVENTOR
Walter A. Schulz
BY
ATTORNEY Aug. 16, 1932.   W. A. SCHULZ   1,872,353
FILM GATE
Filed Jan. 11, 1930   3 Sheets-Sheet 3

INVENTOR
Walter A. Schulz
BY
ATTORNEY

Patented Aug. 16, 1932

1,872,353

UNITED STATES PATENT OFFICE

WALTER A. SCHULZ, OF WILKINSBURG, PENNSYLVANIA, ASSIGNOR TO WESTINGHOUSE ELECTRIC & MANUFACTURING COMPANY, A CORPORATION OF PENNSYLVANIA

FILM GATE

Application filed January 11, 1930. Serial No. 420,123.

My invention relates to cinematographic apparatus and it has particular relation to improvements in the film-tensioning means used therein.

As is well known to those skilled in the motion-picture art, in order that a satisfactory picture may be projected on a screen, it is necessary that the film shall present a smooth surface to the light from the source, and, in addition, it is essential that the surface of the film shall be presented to the light in substantially a constant geometric position relative to the source and the projection lens, throughout the entire projection of the film.

Furthermore, in acoustic-cinematography, when the sound record is on the film in the form of a photographic strip, a microscope objective of small depth-of-focus is often used, in an optical position corresponding to that of the projection lens in the picture system.

It is obvious that, in this connection, the above expressed requirements for smoothness and rigidity of position of the film are extremely rigorous. In fact, the allowances of variation from these conditions are considerably smaller at the sound take-off than they are at the picture take-off.

Devices for putting the film into the condition demanded by these circumstances are commonly called film gates and those made according to the teachings of the prior art, with which I am familiar, fall principally into two classes.

1. Gates in which the film is not perceptibly flexed.

2. Gates in which the film is flexed into a cylindrical surface the elements of which are normal to the direction of motion.

The gates of the first group have, ordinarily, been constructed in two principal sections, namely, a fixed section, usually called the aperture plate, and a structure commonly known as the shoe plate, movable relative to the aperture plate and supporting a plurality of rigid frames called shoes that are adapted to exert a resilient pressure on the film.

Gates of this general construction have performed satisfactorily when used in connection with the projection or the photographing of cinematographic film but have not been of considerable use in connection with the reproduction or the recording of photographic acoustic records by reason of the fact that the rigorous requirements for the presentation of a smooth and unvarying surface to the light beam resulted in a demand for a condition of high normal pressure on the film which, in turn, resulted in a condition of longitudinal tension therein in excess of its rupture stress.

On the other hand, those experienced in the motion-picture art have long been familiar with the fact that, in gates of the above type, the film often instead of having a uniform smooth motion between exposures, moves in jerks. This phenomenon has been known as "chattering" and, while it has not constituted a serious defect at the picture take-off, where the motion is ordinarily intermittent, it has, in the past, had disastrous results at the sound take-off where the motion must be continuous.

As the film, by reason of its stiffness, tends to assume a relatively smooth surface when flexed, various designs of gates of the second type have been proposed for avoiding some of the evils which arise in connection with the use of gates under the first group.

The early practice of the prior art, in connection with the film-flexing gate, has been to dispense with the shoe plate and shoes, and to rely merely on the stiffness of the film for constancy of position and smoothness of surface. However, this structure did not yield satisfactory results, and an attempt was made to use a curved rockable frame as a gate shoe.

In this type of structure, the curved section of the shoe plate must be accurately machined to the same radius of curvature as the flexed film to assure a condition of complete surface contact between the film and the shoe. The manufacture of a gate of such character involves considerable expense.

Furthermore, it has been found that such construction does not entirely eliminate "chattering".

It is, accordingly, an object of my invention to provide a gate of such structure as to eliminate or minimize the above discussed undesirable characteristics.

Another object of my invention is to provide a gate which lends itself readily to inexpensive manufacture.

A further object of my invention is to provide a gate that can be manipulated with facility, requiring no special mechanical skill on the part of the operator.

A still further object of my invention is to provide a shoe for a film-gate wherein the normal pressure exerted on the film may be readily adjusted to any desired magnitude.

More specifically stated, it is an object of my invention to provide inexpensive means for holding a film yieldingly in a constant geometric position relative to the optical devices associated therewith, to make provision for the prevention of warping or buckling of the surface of the film presented to the illuminating or exciting beam of light and to accomplish these purposes in such manner that the film will not be excessively strained and will move without "chattering" under the action of a constant pulling force.

According to my invention, I provide, for a curved aperture plate, flexible pressure means so constructed that, when brought into forced contact with the smooth curved surface of the aperture plate or of the film riding on this plate, it immediately forms itself into a configuration of curvature equivalent to the curvature of the plate.

Figure 2:
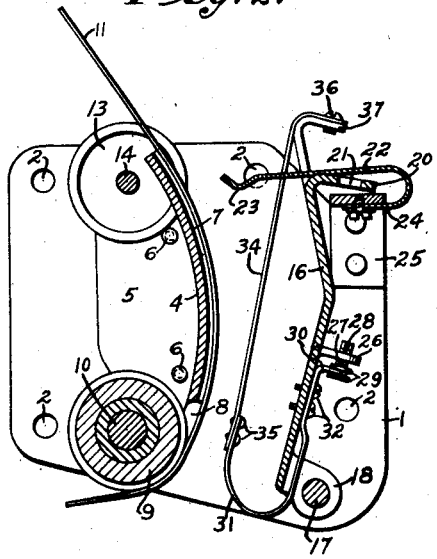
Figure 3:
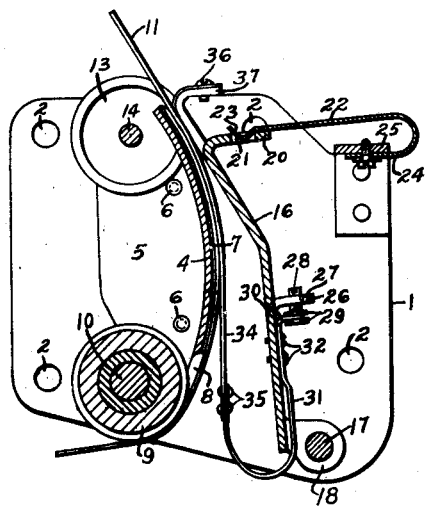
Figure 9:
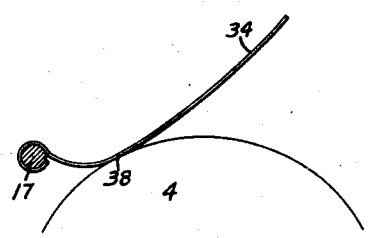
Figure 8:
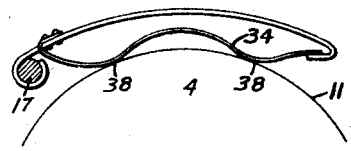
Figure 10:
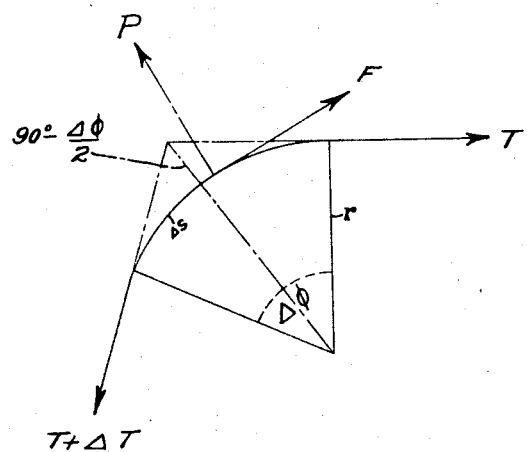

The novel features that I consider characteristic of my invention are set forth with particularity in the appended claims. The invention itself, however, both as to its organization and its method of operation, together with additional objects and advantages thereof, will best be understood from the following description of a specific embodiment of my invention, when read in connection with the accompanying drawings, in which:

Figure 1 is a view, in perspective, of the essential elements of a film gate in open position, Fig. 2 is a sectional view taken along the line II—II of Fig. 1 and showing the film, Fig. 3 is a sectional view taken along a line corresponding to the line II—II but with the gate in a closed position, Figs. 4, 5, 6 and 7 are sectional views, similar to Fig. 3, of a plurality of modifications of my invention, Fig. 8 is a schematic view of a faulty modification of my invention, Fig. 9 is a schematic view of a modification of an aperture plate and a shoe plate and is intended in explaining the failure of a gate of a construction of the type shown in Fig. 8, Fig. 10 is a drawing of a small section of a gate shoe constructed according to the precepts of my invention, showing the external forces which, in acting upon the section, have appreciable physical influences on it.

The apparatus shown in the drawings comprises a frame 1 to which are fastened the fixed and movable sections of the film gate to be hereinafter described and which is, in turn, fastened to a motion-picture machine, in proper relationship to its other parts, by screws passing through holes 2 in the plate.

A curved aperture plate 3, consisting of a cylindrical metallic plate 4, modified as will be presently described and bounded by two plane ears 5 that make a junction with the aperture plate along the two curved edges of the plate, is fastened to the main plate 1 by two screws 6 that pass through the inner ear.

In order to prevent the picture or the photographic sound track on the film from being marred or scratched, the aperture plate 4 is provided with the usual relieved sections 7 commonly used in this connection, while a slot 8, extending across the plate from ear to ear, permits the free rotation of an idler 9, similarly relieved and revolvably mounted on a shaft 10 supported by the ears 5, which prevents the film 11 from being torn by the lower edge of the plate.

Two slots, extending from the ears 5 a short distance inward and from the top a short distance downward, permit the free rotation of the rigid flange 12 and the movable flange 13 of a lateral guiding idler that is revolvably mounted on a shaft 14 rigidly supported by the ears 5. An aperture 15 that, in the present embodiment, is specifically adapted for sound is provided at a suitable position in the aperture plate.

As is apparent from the drawings and from the description, the whole aperture plate may be made by stamping the necessary slots and holes in a single metallic plate that may then be bent into the required configuration.

A shoe-carrying frame 16, having a greater curvature than the aperture plate 4, is pivotally mounted and supported on a shaft 17 fastened to the main plate 1 and extending through two ears 18 that are bent back from the plate 16 in a direction perpendicular to it. The shoe-carrying plate 16 may be moved about the pivot 17 by means of a handle 19 extending outwardly from the plate 16.

At the end of the plate 16, opposite to the pivoted support 17 and extending centrally between the two ears 18 and normal to the plate 16, is an arm 20 having a square hole 21 centrally located near its outer end. A spring 22 having a raised section 23 near one end, and a bent-under section 24 on the other end is fastened to an L section 25, that is, in turn, fastened to the plate 1, and extends through an opening in the plate 16 above the arm 20 in such manner that the raised section 23 catches in the hold 21 in the arm 20, thus locking the plate in its closed position, as shown in Fig. 3.

Two short arms 26 are located near the central section of the plate 16 and these are equipped with tapped holes adapted to carry two studs 27 formed, at one end, with a slot 28 for a screw driver and, at the opposite end, with two flanged sections 29, between which fingers in a stud 30, bent back from springs of J section 31, may be slidably mounted.

A plurality of screws 32 extend through slots 33 in the springs 31 and hold them against the shoe-carrying plate 16. When the screws 32 are released, the springs 31 may thus be readily moved up or down along the shoe-carrying plate 16 by turning the studs 27. The purpose of this structure, as may be seen from the sketches, is to put into a state of greater or less tension a plurality of metallic straps or shoes 34, the lower ends of which are fastened, by means of rivets 35, to the short arm of the springs 31, and the upper ends of which are bent over and fastened, by screws 36, to stubs 37 extending from the upper edge of the shoe-carrying plate.

It is obvious that the shoe-carrying plate 16 and all of its accessories may be made of sheet material by punching and bending processes.

I can best explain the reason for the application of variable tension to the film shoes by reference to Figs. 8, 9 and 10.

In Fig. 8 is demonstrated the form that an untensioned gate shoe 34, used in combination with an aperture of arbitrary form, will assume when in closed position. As is apparent, this type of shoe introduces the unsatisfactory state of affairs wherein the film makes contact with the shoe along two lines 38 and will, consequently, buckle between these two lines.

Fig. 9 shows the form which the metallic strap 34, of which the shoes are made, will assume when supported at only one end and held in forced contact with a solid curved surface.

The forms assumed by the straps in both Figs. 8 and 9 are a direct result of the stiffness of the material, as can clearly be seen from a simple theoretical consideration, in the light of structure theory, wherein the strap is regarded as a flexed cantilever beam. This state of affairs would not exist in a non-metallic band or string, and hence, it is the function of the springs 31, supporting the metallic shoe straps 34, to cause the latter to approximate the action of strings in conforming to a smooth curved surface.

More concisely stated, in an untensioned-shoe-strap type gate the aperture plate must be made to conform to the strap while, in the tensioned-shoe-strap type of gate, the strap may be made to conform to the aperture plate.

That any desirable state of normal pressure of the spring against the film and, hence, any state of tension in the film can be attained may be clearly seen from the following theoretical demonstration, read in connection with Fig. 10, in which T is the tension, at one end, longitudinal to a short section of the strap.

$T+\Delta T$ is the tension at the other end.

P is the pressure per unit length of the film normal to the strip.

F is the frictional force per unit length of the moving film along the strip.

$\Delta \phi$ is the angle between the radius of curvature at the two ends of the strip that may be taken approximately equal for a short section of the strip.

Summing the external forces normal to the small strip, we get, (1) $$T \sin \frac{\Delta \phi}{2} + (T+\Delta T) \sin \frac{\Delta \phi}{2} = P \Delta S$$

where $\Delta S$ is the length of the strip.

Equation (1) for a small strip becomes (2) $$T \frac{\Delta \phi}{2} + T \frac{\Delta \phi}{2} + \frac{\Delta T \Delta \phi}{2} = P \Delta S$$

or (3) $$T + \frac{\Delta T}{2} = P \frac{\Delta S}{\Delta \phi}$$

which, in the limit taken for $\Delta \phi = 0$, becomes (4) $$T = P \frac{ds}{d\phi}$$

(5) $$T = Pr$$

(6) $$P = \frac{T}{r}$$

where $r$ is the radius of curvature of the strip at a point at which P is the normal pressure per unit length which it exerts on the film and T is the tension in the film.

It is obvious that T, and, hence, the pressure on the film, can be made to assume any desired continuous distribution, depending on the geometric form of the aperture plate, and, for the circular form of aperture plate which is used in the embodiment of the invention described herein, has a value given by (7) $$T = T_0 e^{-\mu \phi}$$

where $T_0$ is the tension on the shoe strap at the end at which the film enters the gate, $\phi$ is the angular distance along the arc between the point at which the tension T exists and the point at which the tension $T_0$ exists, and $\mu$ is the coefficient of friction between the shoe and the film.

In this particular case, a state of maximum pressure on the film exists at the point where it enters the gate, and the pressure decreases continuously, being a minimum at the point where the film leaves the gate.

Although I have shown and described certain specific embodiments of my invention, I am fully aware that many modifications thereof are possible. In particular, I may point out that my invention provides a possibility of attaining any desired state of tension in the film that may be found advantageous. Furthermore, I may add that it is of importance, in the preferred application of my invention to acoustic work, that the emulsion side of the film be in contact with the shoe and not with the aperture plate, by reason of the fact that, if emulsion is permitted to gather on the aperture plate, the film will be thrown out of focus.

My invention is, therefore, not to be restricted except insofar as is necessitated by the prior art and by the spirit of the appended claims.

I claim as my invention:

1. In film-handling apparatus, a curved aperture plate, means for guiding a film strip laterally as it passes to said aperture plate in combination with a shoe carrying plate, a plurality of springs adjustably fastened to said shoe-carrying plate and adapted to hold, in a state of tension, a plurality of flexible shoe straps, one end of each strap being fastened to each of said springs and the other end of each strap being fastened to said shoe-carrying plate, and spring means in the neighborhood of said plates adapted to so hold said shoe-carrying plate in juxtaposition to said aperture plate that said shoe straps are in engagement therewith.

2. In film-handling apparatus, an aperture plate and means for guiding a film strip laterally as it passes to said aperture plate, in combination with a shoe-carrying plate, spring means fastened to said shoe-carrying plate adapted to hold, in a state of adjustable tension, two flexible shoe straps one end of each of which is fastened to said spring means, and the other end of each of which is fastened to said shoe-carrying plate, and a spring adapted to so hold said shoe-carrying plate in juxtaposition to said aperture plate that said shoe straps are in engagement therewith.

3. In film-handling apparatus, an aperture plate, a shoe-carrying plate, means fastened to said shoe-carrying plate adapted to hold, in a state of manually adjustable tension, a resilient shoe strap one end of which is fastened to said tension means and the other end of which is fastened to said shoe-carrying plate, and means for fastening said shoe-carrying plate in operative position to engage said aperture plate in one of said positions.

4. In film-handling apparatus, an aperture plate, a shoe-carrying plate, means fastened to said shoe-carrying plate to hold, in a state of tension, a flexible shoe strap, one end of which is fastened to said tension means and the other end of which is fastened to said shoe-carrying plate, and means for fastening said shoe-carrying plate in operative position to engage said aperture plate in one of said positions.

5. In film-handling apparatus an aperture plate, a shoe plate coacting therewith, at least one flexible strap on said shoe plate and spring means secured to said shoe plate and to an end of said strap to maintain said strap in a state of longitudinal tension.

6. In film-handling apparatus a curved aperture plate, a shoe plate coacting therewith, at least one flexible strap on said shoe plate and spring means secured to said shoe plate and to an end of said strap to maintain said strap in a state of longitudinal tension.

In testimony whereof, I have hereunto subscribed my name this 4th day of January, 1930.

WALTER A. SCHULZ.